United States Patent [19]

Newnham et al.

[11] Patent Number: 5,729,077

[45] Date of Patent: Mar. 17, 1998

[54] METAL-ELECTROACTIVE CERAMIC COMPOSITE TRANSDUCER

[75] Inventors: Robert E. Newnham; Aydin Dogan, both of State College, Pa.

[73] Assignee: The Penn State Research Foundation, University Park, Pa.

[21] Appl. No.: 572,983

[22] Filed: Dec. 15, 1995

[51] Int. Cl.⁶ .................................................. H01L 41/08
[52] U.S. Cl. ..................... 310/328; 310/334; 310/369
[58] Field of Search .................................. 310/324, 328, 310/333, 334, 337, 344, 369

[56] References Cited

U.S. PATENT DOCUMENTS

| | | | |
|---|---|---|---|
| 2,403,692 | 7/1946 | Tibbetts | 310/328 |
| 2,487,962 | 11/1949 | Arndt, Jr. | 310/369 X |
| 2,540,851 | 2/1951 | Wiggins et al. | 310/328 |
| 2,592,703 | 4/1952 | Jaffe | 310/334 X |
| 2,607,858 | 8/1952 | Mason | 310/369 X |
| 2,836,738 | 5/1958 | Crownover | 310/328 |
| 2,895,062 | 7/1959 | Abbott | 310/369 X |
| 3,287,692 | 11/1966 | Turner | 310/334 X |
| 4,845,688 | 7/1989 | Butler | 367/174 |
| 4,999,819 | 3/1991 | Newnham et al. | 367/157 |
| 5,030,873 | 7/1991 | Owen | 310/337 |
| 5,276,657 | 1/1994 | Newnham et al. | 367/157 |
| 5,471,721 | 12/1995 | Haertling | 310/369 X |
| 5,517,074 | 5/1996 | Van Pelt et al. | 310/328 |

Primary Examiner—Mark O. Budd
Attorney, Agent, or Firm—Thomas J. Monahan

[57] ABSTRACT

A metal-ceramic device includes an electroactive ceramic substrate having a pair of opposed planar surfaces and a thickness aspect. Conductive electrodes sandwich the ceramic substrate and a first sheet metal cap having a concave shape, a substantially unchanging thickness and a rim is joined to a first planar surface of the ceramic substrate. A second sheet metal cap having a concave shape, a substantially unchanging thickness and a rim is bonded to a second planar surface of the ceramic substrate, the second planar surface opposed to the first planar surface. In an actuator embodiment, a potential is applied across the conductive electrodes to cause an expansion of the ceramic substrate in the thickness dimension and a concomitant contraction in its planar dimensions. The contraction causes a flexure of the sheet metal caps, which flexures are used for actuation purposes. In a sensor embodiment, the sheet metal caps are subjected to a displacement by an instrumentality, and a resulting change in voltage across the ceramic substrate is sensed.

15 Claims, 10 Drawing Sheets

METAL-ELECTROACTIVE CERAMIC COMPOSITE TRANSDUCER

GOVERNMENT SUPPORT

This invention was made with Government support under Grant N00014-92-J-1510 awarded by the U.S. Department of the Navy. The Government has certain rights in the invention.

FIELD OF THE INVENTION

This invention relates to electroactive ceramic transducers (piezoelectric, electrostrictive, etc.) and, more particularly, to a metal-ceramic electroactive actuator/sensor exhibiting large positional displacements.

BACKGROUND OF THE INVENTION

In recent years, piezoelectric, and electrostrictive ceramics have been used as displacement transducers, precision micropositioners, and various actuator applications. An important drawback to such transducers, however, is the fact that the magnitude of strain in such ceramics is limited to approximately 0.1%. Magnification mechanisms have, therefore, been developed to produce sizeable displacements at low voltages.

The two most common types of electroactive ceramic actuators are the multi-layer ceramic actuator with internal electrodes, and the cantilevered bimorph actuator. A bimorph-type actuator will execute a large bending or "wagging" motion with the application of an AC or DC field. Although such actuators exhibit large displacements (generally on the order of several hundred microns), their generative force and response speeds are not high. Multi-layer actuators exhibit significantly larger generative forces, although their displacement values are limited. Such multi-layer actuators characteristically comprise a lead titanate-lead zirconate (PZT) ceramic or a lead titanate-doped lead magnesium niobate (PMN-PT) type ceramic, having a hundred volts of DC applied.

There is a need for an electroactive ceramic actuator to provide sizeable displacements with sufficient force to carry out actuator applications.

In U.S. Pat. No. 4,999,819 the inventors hereof previously disclosed an acoustic transducer, of sandwich construction, that is particularly useful for the transformation of hydrostatic pressures to electrical signals. A pair of metal plates are positioned to sandwich a piezoelectric element, with each plate having a cavity formed adjacent to the piezoelectric element. The plates are bonded to the piezoelectric element to provide a unitary structure. The cavities provide a stress-transforming capability which amplifies an incoming compressive stress and converts it to a radial extensional stress in the ceramic. The ceramic is generally poled in the thickness dimension and exhibits $d_{33}$, $d_{31}$, and $d_{32}$ piezoelectric coefficients.

As is known to those skilled in the art, the $d_{33}$ coefficient lies in the direction of a ceramic's poling, whereas the $d_{31}$ and $d_{32}$ coefficients describe the action of the ceramic in a plane that is orthogonal to the direction of poling. In the transducer shown in the '819 patent, the cavities transform most of an incoming stress in the $d_{33}$ direction to the $d_{31}$ and $d_{32}$ directions in the piezoelectric slab. By monitoring the voltage generated across the slab, the resulting pressure wave was sensed.

U.S. Pat. No. 5,276,657 to the inventors hereof and assigned to the same assignee of this application, describes a ceramic actuator similar to that shown in FIG. 1. The actuator includes a piezoelectric or electrostrictive ceramic disc 10 with conductive electrodes 12 and 14 bonded to its major surfaces. A pair of metal end caps 16 and 18 include rims that are bonded to ceramic conductive electrodes 12 and 14, respectively. Each end cap is comprised of a solid metal disc having a cavity formed in one surface.

Figure 1:
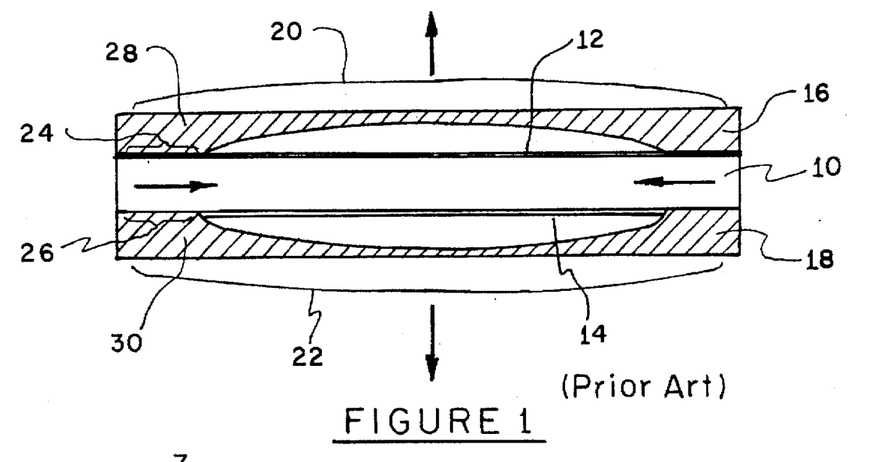
FIG. 1 is a side sectional view of an actuator disclosed in U.S. Pat. No. 5,276,657.

If ceramic disc 10 is a piezoelectric material, it is poled, during manufacture, across its thickness dimension ($d_{33}$). If ceramic disc 10 exhibits an electrostrictive effect or a field-induced antiferroelectric-to-ferroelectric transformation, then it need not be poled.

When a potential is applied across electrodes 12 and 14, ceramic disc 10 expands in the thickness dimension ($d_{33}$). At the same time, ceramic disc 10 contracts in the x and y dimensions ($d_{31}$ and $d_{32}$), causing end caps 16 and 18 to bow outwardly as shown by lines 20 and 22 respectively. The bowing action amplifies the actuation distance created by the contraction of ceramic disc 10, enabling use of the structure as an actuator.

While substantial displacements were achieved through use of the structure of FIG. 1, it has since been determined that end caps 16 and 18 inhibited, to an extent, the displacements achievable through actuation of ceramic disc 10. The large inactive regions of the metal caps reduced the actuator displacement and the electromechanical coupling factor. Moreover, the length of bonding areas 24 and 26 and the fact that end caps 16 and 18 essentially pivoted about the thick metal regions 28 and 30, contributed to a highly position dependent actuation distance that varied with position on the end cap. Such end caps showed a highest displacement at the geometric center of the end cap, with the displacement decreasing dramatically when moving from the center to the edge. For certain applications, it was difficult to find the central point and adjust it. Further, end caps of the type shown in FIG. 1 are expensive to produce due to the requirements for machining of the cavities therein.

Accordingly, it is an object of this invention to provide an improved electroactive, metal-ceramic device.

It is another object of this invention to provide a metal-ceramic actuator/sensor which exhibits substantial actuation distances.

It is a further object of this invention to provide a metal-ceramic electroactive actuator/sensor having end caps that are inexpensive to produce.

SUMMARY OF THE INVENTION

A metal-ceramic device includes an electroactive ceramic substrate having a pair of opposed planar surfaces and a thickness aspect. Conductive electrodes sandwich the ceramic substrate and a first sheet metal cap having a concave shape, a substantially unchanging thickness and a rim is joined to a first planar surface of the ceramic substrate. A second sheet metal cap having a concave shape, a substantially unchanging thickness and a rim is bonded to a second planar surface of the ceramic substrate, the second planar surface opposed to the first planar surface. In an actuator embodiment, a potential is applied across the conductive electrodes to cause an expansion of the ceramic substrate in the thickness dimension and a concomitant contraction in its planar dimensions. The contraction causes a flexure of the sheet metal caps, which flexures are used for actuation purposes. In a sensor embodiment, the sheet metal caps are subjected to a displacement by an instrumentality, and a resulting change in voltage across the ceramic substrate is sensed.

DETAILED DESCRIPTION OF THE INVENTION

Figure 2:
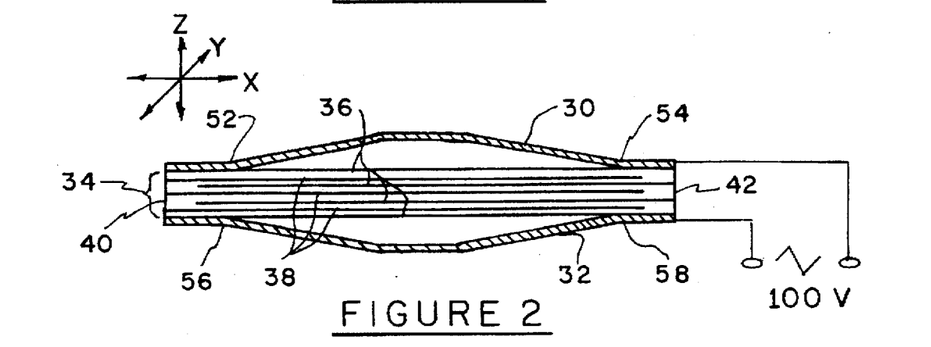
FIG. 2 is a side sectional view of an actuator embodying the invention.
Figure 4:
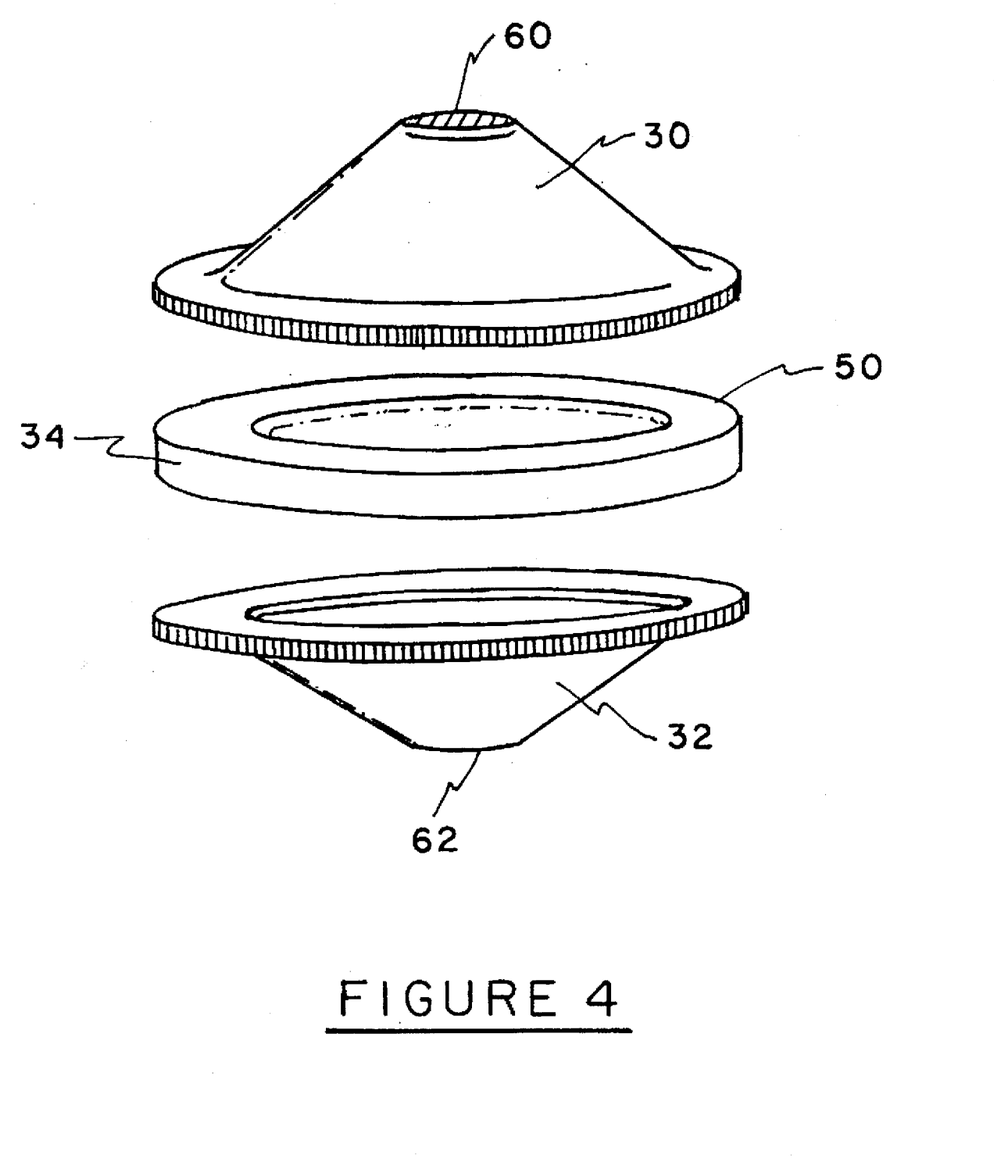
FIG. 4 is a perspective view of a disassembled actuator embodying the invention.

It has been determined that the deficiencies of the prior art structure shown in U.S. Pat. No. 5,276,657 can be overcome by replacing the end caps shown therein with formed sheet metal end caps. Such a structure is shown in FIG. 2, wherein end caps 30 and 32 are comprised of formed sheet metal and take the shape of truncated cones. A three dimensional exploded view of the structure is shown in FIG. 4. Because of the similarity of end caps 30 and 32 to cymbals, the design shown in FIGS. 2 and 4 is called a composite "cymbal" actuator/sensor.

Each cymbal end cap is preferably produced by a stamping process wherein a metal sheet is both cut and shaped to the cymbal form in a stamping action. The metal sheet preferably exhibits a relatively constant thickness dimension that is thin in relation to the overall surface area of the end cap structure. The thickness of the metal sheet is dependent upon the actuation pressure required and will, as a result, be thicker when higher actuation pressures are needed.

A multi-layer ceramic substrate 34 includes a plurality of interspersed electrodes 36 and 38 across which an actuating potential is applied. Electrodes 38 are connected together by an end conductor 40 to end cap 32 and conductive electrodes 36 are connected together via conductor 42 to end cap 30.

Both end caps 30 and 32 are bonded to ceramic substrate 34 about their entire periphery through use of a bonding agent 50 (see FIG. 4).

Figure 3:
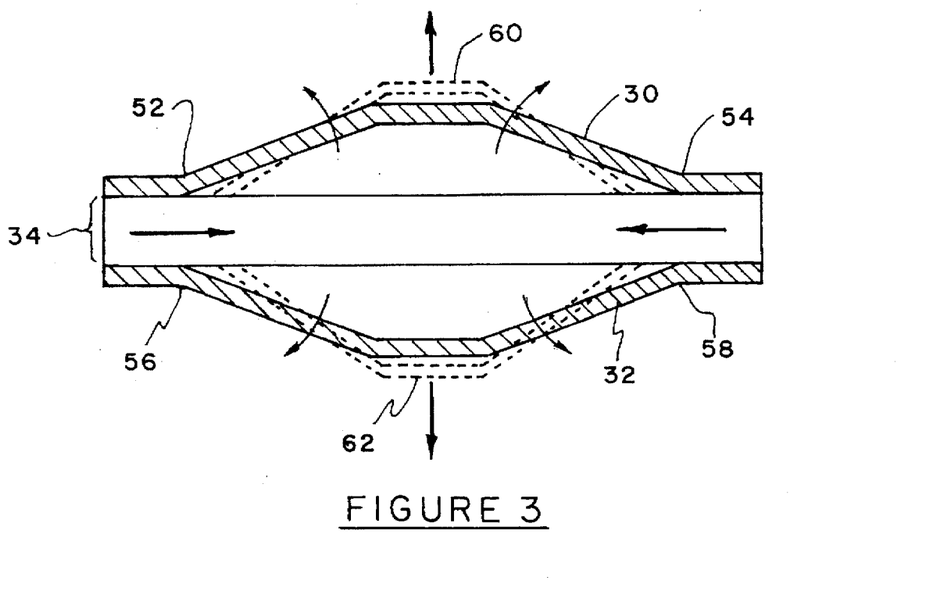
FIG. 3 is a view of the actuator of FIG. 2 showing movement of its respective end caps upon application of a potential across an included ceramic substrate.

When a voltage is applied across ceramic substrate 34 by application of an appropriate potential to electrodes 36 and 38, an expansion of ceramic substrate 34 takes place in its z dimension, causing contraction in its x and y dimensions. As a result, both end caps 30 and 32 pivot about bend points 52, 54 and 56, 58, respectively. In addition, the inward movement of ceramic substrate 34 (see FIG. 3) causes the sidewalls of end caps 30 and 32 to rotate about bend points 52, 54 and 56, 58. As a result, substantial displacements of end surfaces 60 and 62 occur.

Preferred materials for end caps 30 and 32 are dependent upon application. If displacement is the principal objective (with low forces), aluminum or copper-based metals are preferred. If substantial force is required in the displacement action, a stiffer metal such as tungsten is preferred. Thus, end caps 30 and 32 can be made of metals (such as brass, bronze, kovar, zirconium, tungsten), polymers and polymer based composites and glass-based materials. End caps 30 and 32 are preferably bonded to ceramic substrate via an epoxy bond material or other appropriate bonding agent. Further, while many ceramics, as discussed below, are appropriate for application to the cymbal actuator, it is preferred that the ceramic material exhibit high $d_{31}$ and $d_{32}$ coefficients so as to enable, for a given applied voltage, the greatest available lateral motion of the ceramic substrate.

Figure 5:
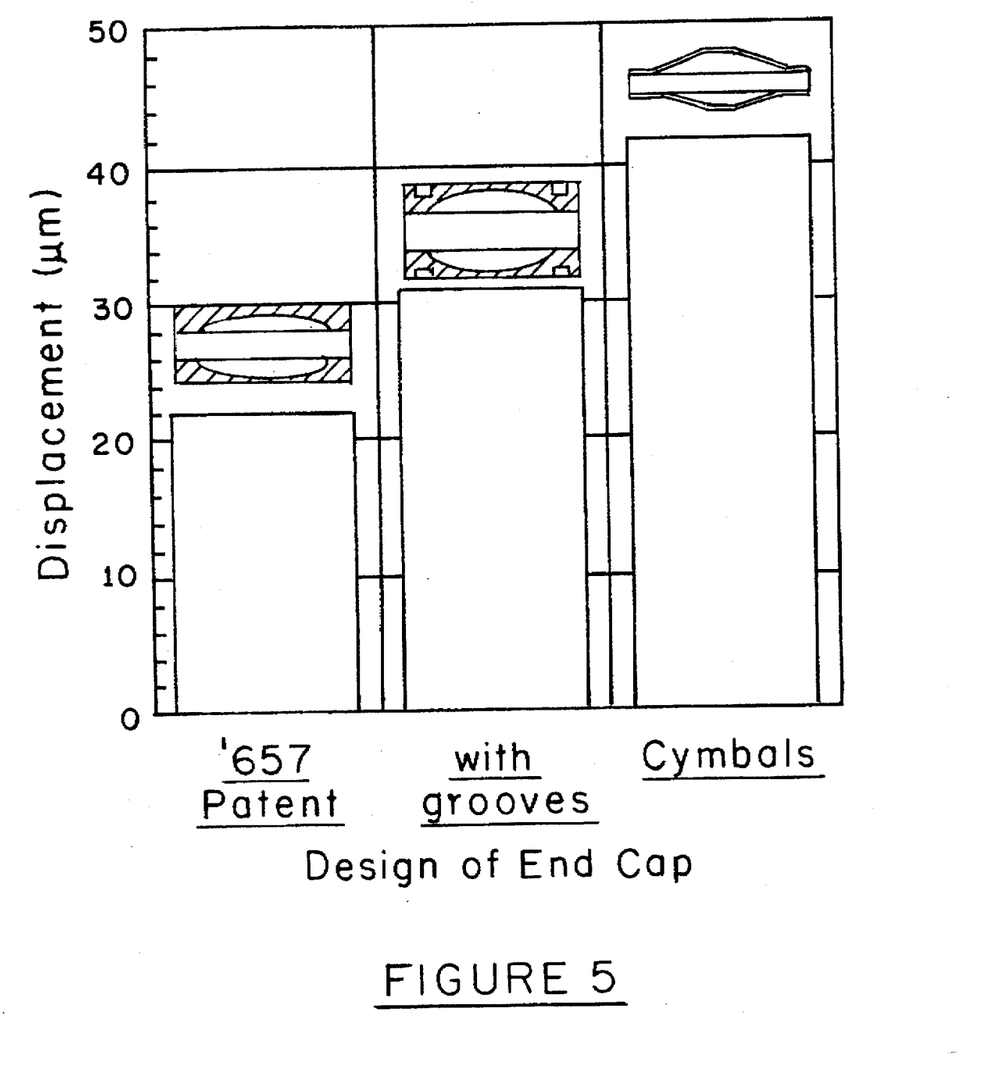
FIG. 5 is a chart comparing available displacements between prior art actuators and an actuator embodying the invention hereof.

In FIG. 5, the displacement values achieved with respect to different end cap designs are illustrated. Each end cap included a fixed cavity depth of 0.20 mm and a cavity diameter of 9.0 mm. The cavity depth was measured from the interior surface of an end cap to the planar surface of ceramic substrate 34. An actuator, as shown in the '657 patent with 0.30 mm thick brass end caps, showed a 22 micrometer displacement. When grooves were cut in the periphery of the end caps shown in the '657 patent, the displacement was increased to 30 micrometers. The groove was 9.0 mm in diameter and 0.2 mm in depth and 1.0 mm in width into the brass end caps. Cymbal transducers, incorporating the invention hereof, with uniformly punched end caps showed a 40 micrometer displacement.

Figure 6:
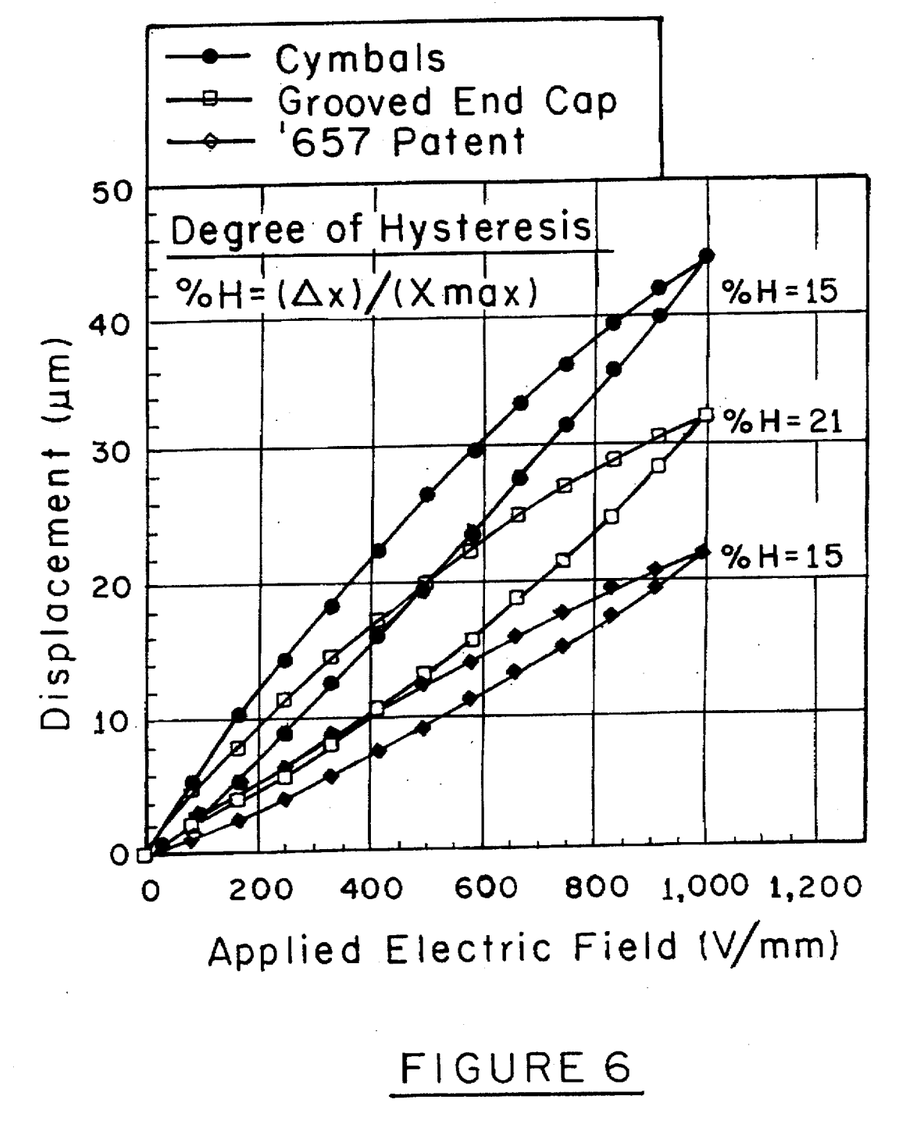
FIG. 6 is a chart plotting displacement versus applied electric field for several prior art actuator structures and an actuator embodying the invention hereof.
Figure 7:
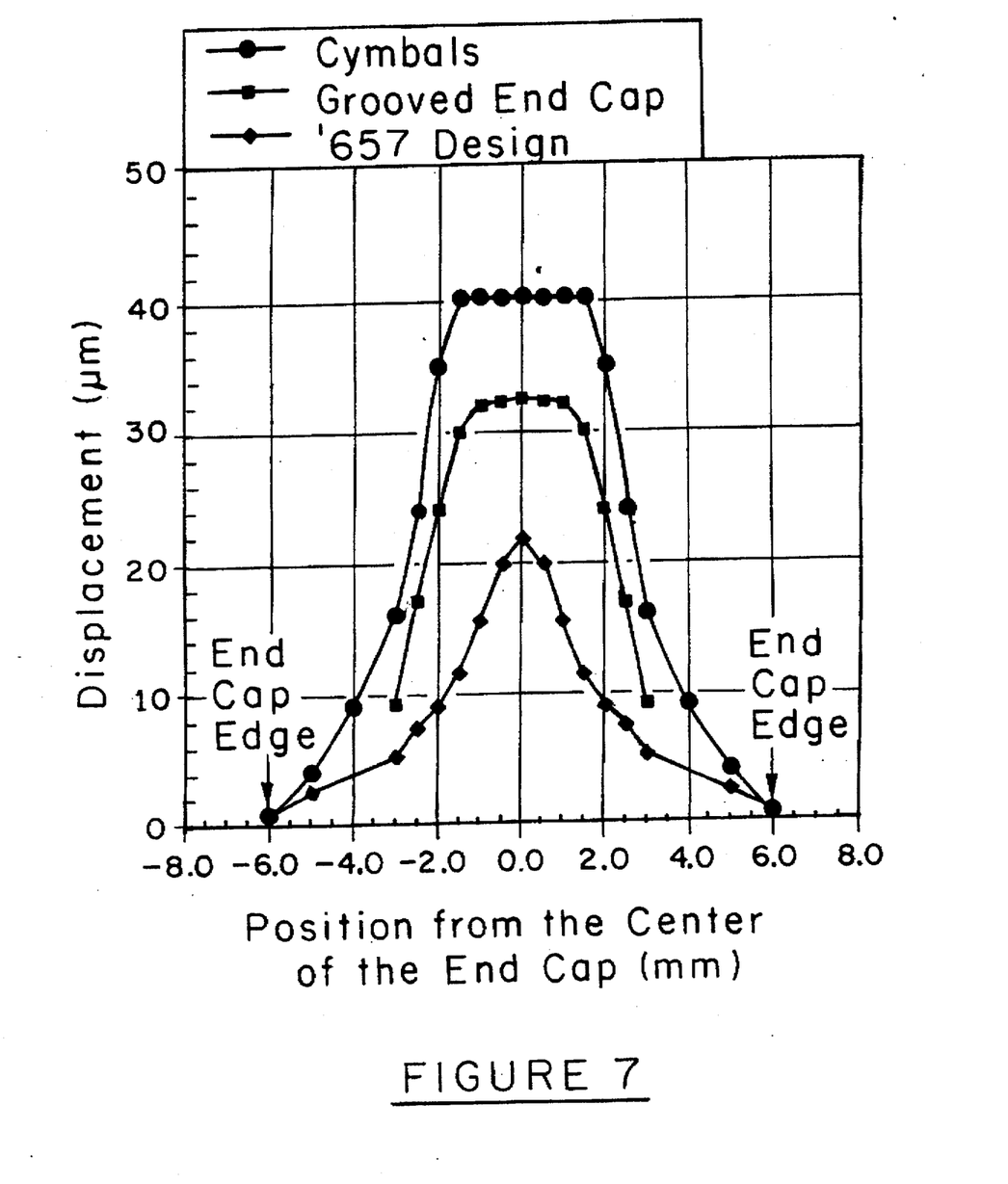
FIG. 7 is a chart plotting displacement versus position from the center of the end cap for several prior art actuator designs and an actuator embodying the invention hereof.

The displacement hysteresis of different actuators is illustrated in FIG. 6. The position-dependency of displacement of different actuator designs is shown in FIG. 7, with the cymbal actuator incorporating the invention hereof exhibiting a greater homogeneity in displacement over a wider area of the end caps.

Figure 8:
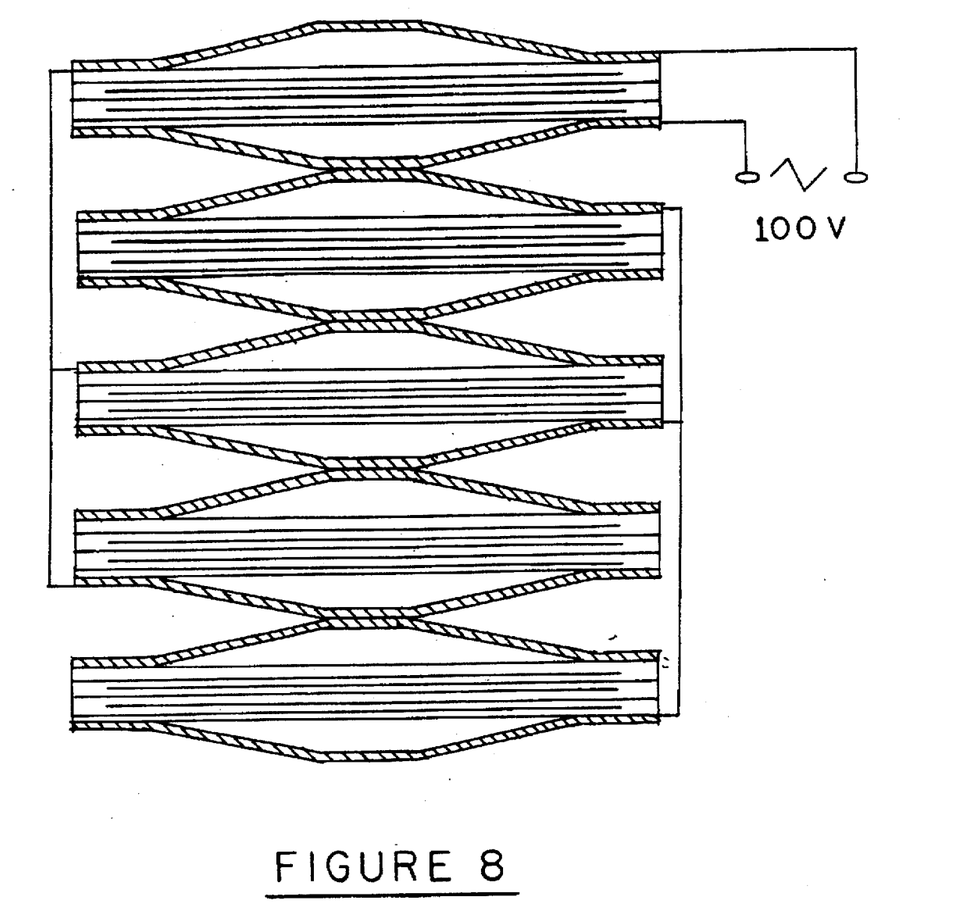
FIG. 8 is a further actuator embodiment constructed in accordance with the invention hereof.

The large, flat contact surfaces 60 an 62 on each of end caps 30 and 32, renders it practical to stack the individual actuators together in order to achieve higher displacements. Such a stacked arrangement is shown in FIG. 8. The structure of FIG. 8 exhibits a greater stability under uniaxial symmetric loading.

Piezoelectric transducer materials that are used with the structures shown and described above are based primarily on the lead zirconate titanate (PZT) family including PLZT ((Pb,La)(Zr,Ti)O$_3$). Electrostrictive ceramic disks utilize lead magnesium niobate (PMN)-based ceramics. Lead titanate-modified PMN (PMN-PT) is preferred. Sizeable displacements are also achievable using Pb(Sn,Zr,Ti)O$_3$ ceramics exhibiting antiferroelectric-to-ferroelectric transitions with applied field.

In summary, the displacement mechanism of the cymbal transducer is a combination of flextensional motion and rotational motion and enables achievement of improved displacements of the respective end caps. Substantially improved uniformity of displacement is achieved, as well as stability under uniaxial loading. Further, production costs of the end caps are greatly reduced with the ability to both punch and form them at the same time.

Figure 9:
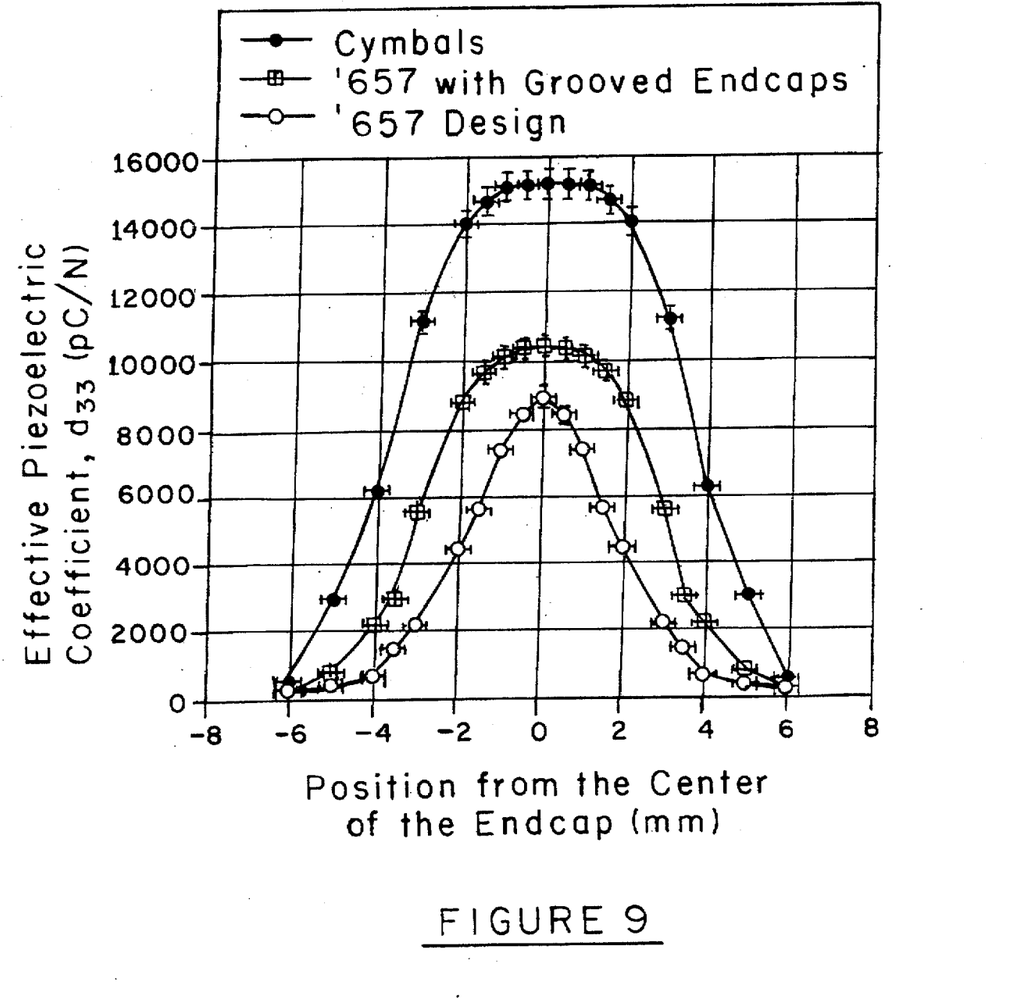
FIG. 9 is a chart plotting effective piezoelectric coefficient $d_{33}$ versus position from the center of an end cap, illustrating usefulness of the device in a sensing configuration.

Transducers embodying the invention can also be configured as sensors. Sensors use the piezoelectric effect in which mechanical pressure on the end caps generates a voltage through the $d_{31}$ and $d_{32}$ coefficients. FIG. 9 is a plot of effective piezoelectric coefficient for different end cap designs versus position with respect to the center of the end cap. The data was accumulated using a Berlincourt $d_{33}$ meter with a sensor embodiment using brass end caps and having the following dimensions: end cap outer diameter =12.7 mm; end cap inner diameter =9.0 mm; ceramic thickness =1.0 mm; ceramic outer diameter =12.7 mm; inner height of cavity =0.2 mm; and thickness of end cap sheet metal =0.2 mm.

Note that the cymbal transducer exhibited clear superiority over other designs tested. With the cymbal end caps, the piezoelectric coefficient showed an increase of almost 60%. The effective piezoelectric charge coefficient of the cymbal transducer was more than 15,000 pC/N.

Figure 10:
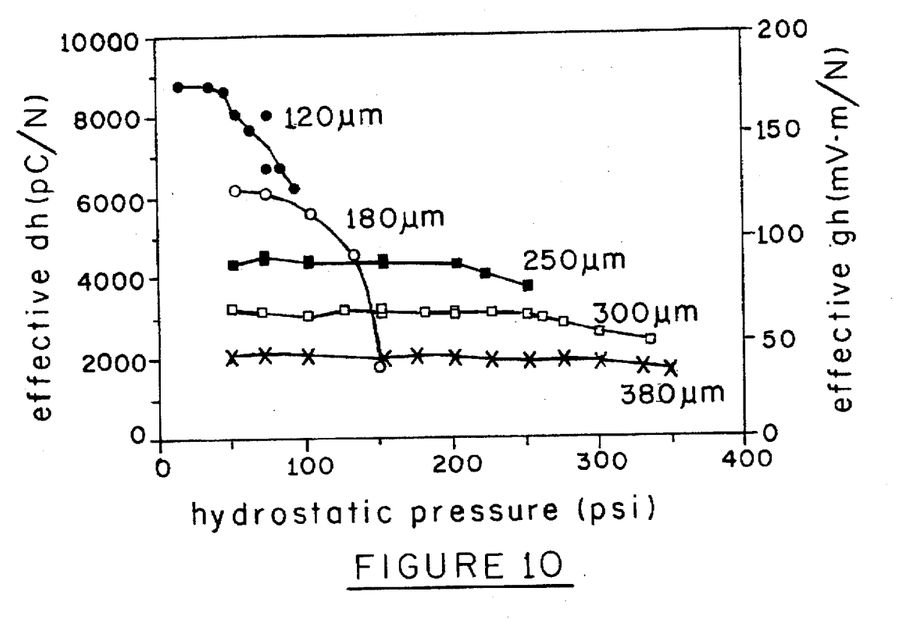
FIG. 10 is a chart plotting effective hydrostatic charge coefficient (dh) and hydrostatic voltage coefficient (gh) versus hydrostatic pressure, illustrating usefulness of the device in a hydrophone application.

Because of its high piezoelectric charge coefficient, the cymbal transducer is applicable to many sensor applications. For instance, such a transducer may be applied to both hydrophone and accelerometer applications. In FIG. 10, measured effective hydrostatic charge coefficient dh and calculated effective voltage hydrostatic coefficient gh are plotted versus hydrostatic pressure. A figure of merit (dh) (gh) of $500,000 \times 10^{-15}$ m$^2$/N was measured for thin end cap structures. The aforesaid figure of merit is almost an order of magnitude higher than the best hydrophone figure of merit obtained using structures disclosed in Applicants' prior referenced patents.

Figure 11:
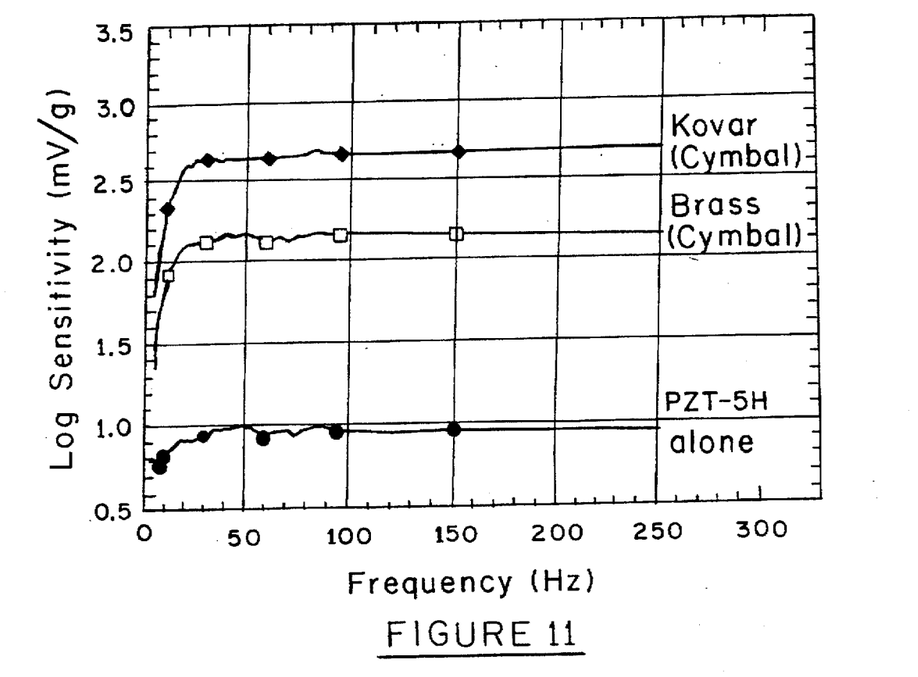
FIG. 11 is a chart plotting sensitivity versus frequency, illustrating linearity of response when the device is used in an accelerometer configuration.

Accelerometers were constructed using the cymbal transducer and, in FIG. 11, their sensitivities were plotted versus frequency of an applied force. Highly linear response characteristics were noted.

Figure 12:
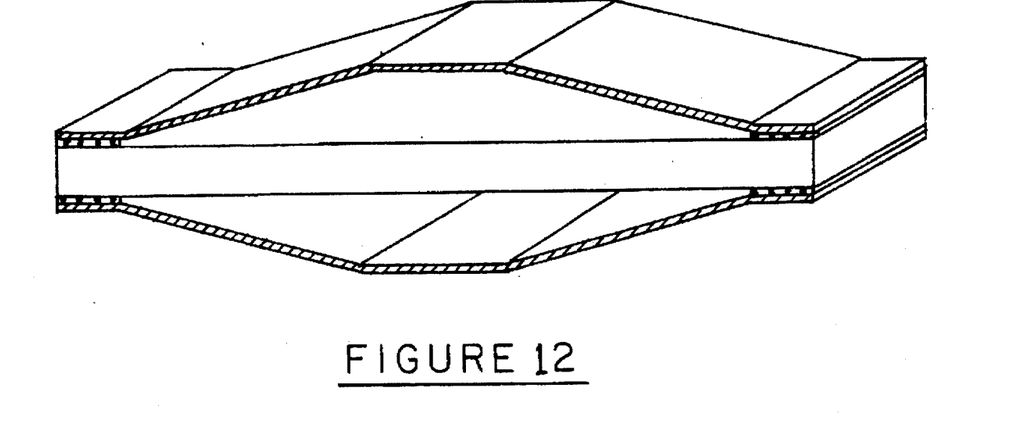
FIG. 12 is a perspective view of a rectangular embodiment of the invention.

While the above description has concentrated on cymbal transducers employing truncated conical end caps, rectangular, pyramidal and prismatic shaped end caps are also within the scope of the invention. FIG. 12 illustrates a perspective view of a rectangular end cap transducer structure.

Figure 13:
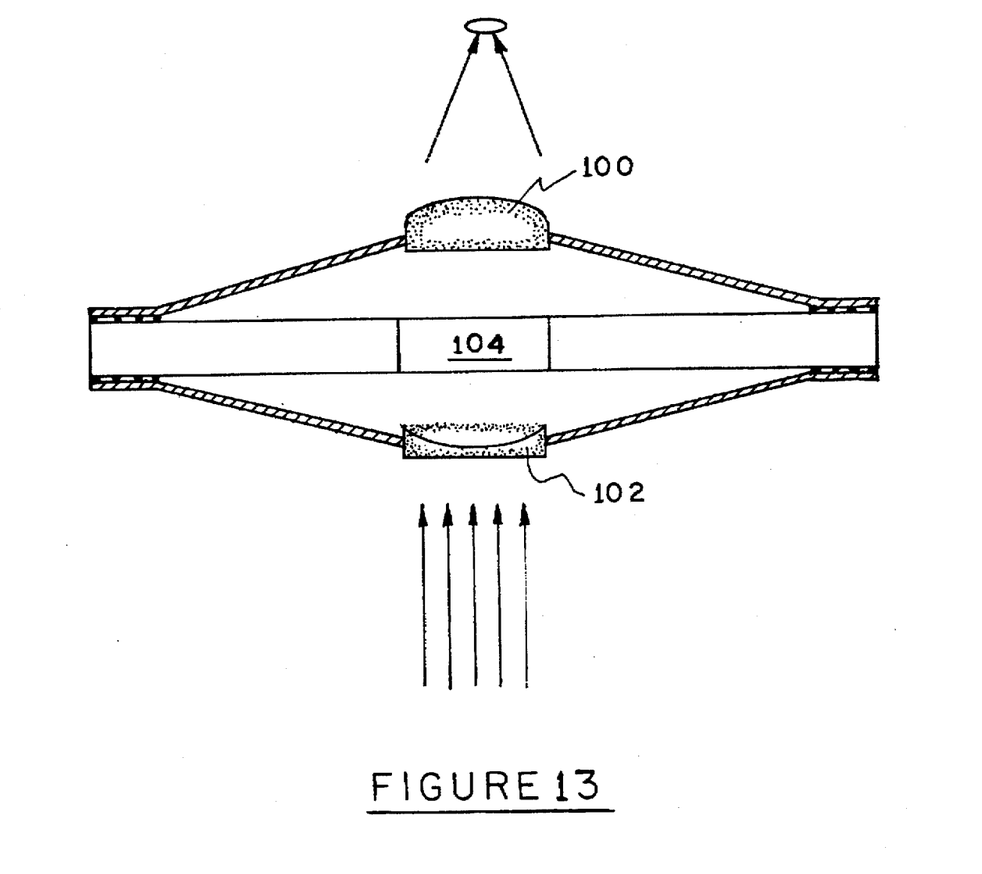
FIG. 13 is a side view of an embodiment of the invention in the form of a controllable microlens.

The cymbal transducer has many possible applications, such as micropositioners, optical scanners, micromanipulators, linear micromotors, relays, microvalves and driving elements for active vibration control. For instance, vibrations in electro-optical systems present serious problems. As shown in FIG. 13, the cymbal transducer may be adapted to an opto-electronic application for vibration control by placing lenses 100 and 102 in apertures in the respective end caps and providing a light passageway 104 through the ceramic substrate. Through appropriate energization of the ceramic substrate, external vibrations can be canceled and the focal length of the arrangement of FIG. 13 maintained constant.

Figure 14:
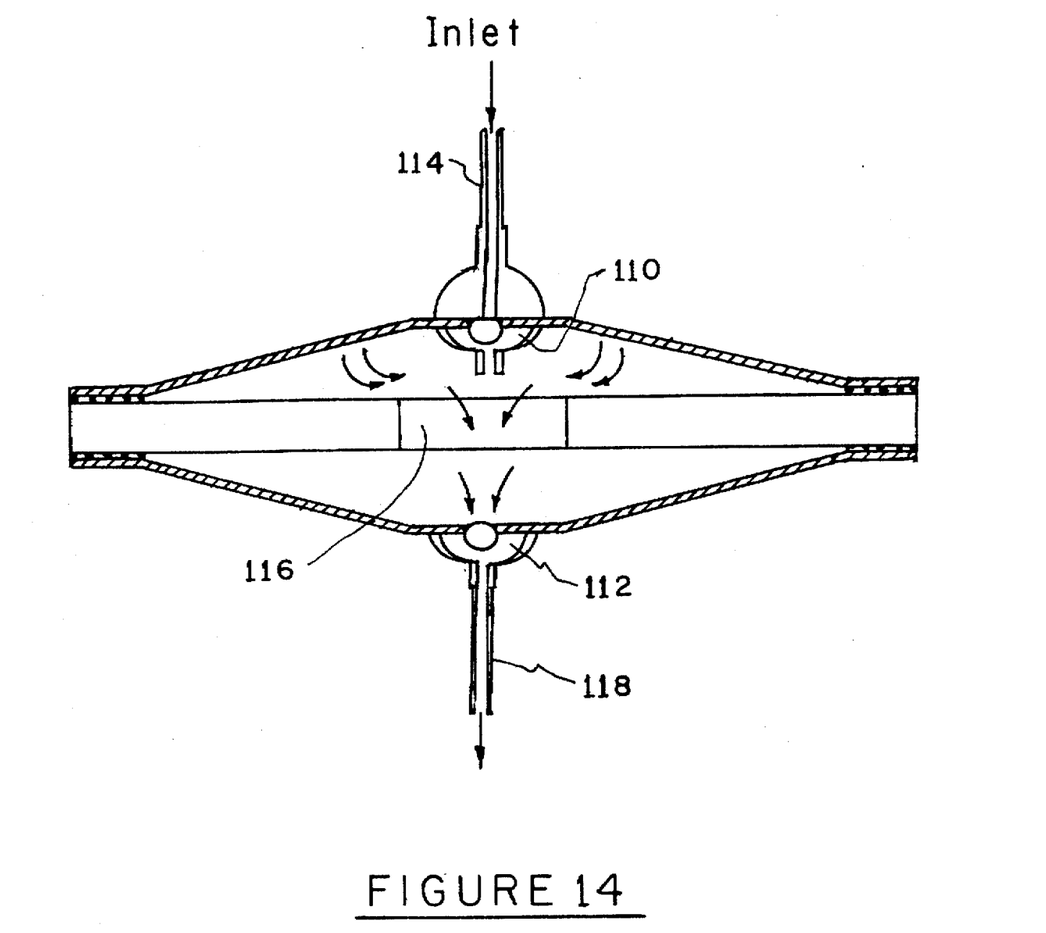
FIG. 14 is a side view of an embodiment of the invention in the form of a micropump.

In FIG. 14, an application of the cymbal transducer as a micropump is illustrated and comprises a pair of ball valves 110 and 112 that are positioned in the respective end caps. Fluid entering inlet 114 may be pumped through the transducer (and aperture 116) to outlet 118. Such pumping action is achieved when appropriate energization is applied to the ceramic substrate to create continuous oscillations thereof and resultant flexures of the respective end caps.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. An electroactive device comprising:

electroactive ceramic substrate means having a disc-shaped, solid ceramic substrate of uniform radius and a pair of opposed, continuous planar surfaces and a thickness aspect, said ceramic substrate having a $d_{33}$ direction parallel to said thickness aspect, and $d_{31}$ and $d_{32}$ directions parallel to said planar surfaces;

conductive electrodes sandwiching said ceramic substrate a first metal cap having a truncated conical shape and formed from a sheet metal stamping and a rim portion joined to a first planar surface of said ceramic substrate;

a second metal cap having a truncated conical shape and formed from a sheet metal stamping and a rim portion joined to a second planar surface of said ceramic substrate, said second planar surface opposed to said first planar surface; and means for applying a potential across said conductive electrodes to enable a field in the $d_{33}$ direction that causes a dimension change in the radius of said ceramic substrate and through said rim portions, a flexure of said first metal cap and second metal cap.

2. The device of claim 1, wherein said electroactive ceramic substrate is poled along the $d_{33}$ direction and exhibits a piezoelectric characteristic.

3. The device of claim 1, wherein said potential is applied between said first metal cap and second metal cap.

4. The device of claim 1, wherein said electroactive ceramic substrate means exhibits an electrostrictive characteristic.

5. The device of claim 1, wherein said electroactive ceramic substrate means exhibits antiferroelectric and ferroelectric switching characteristics.

6. The device of claim 1, wherein said electroactive ceramic substrate means comprises a stack of ceramic substrates, with conductive electrodes positioned therebetween, said means for applying a potential connecting one potential to every other conductive electrode and connecting another potential to conductive electrodes not connected to said one potential.

7. The device of claim 6 wherein said ceramic substrates and conductive electrodes lie in planes that are parallel to said conductive electrodes.

8. A device comprising a plurality of actuators, each actuator structured as recited in claim 1, said actuators stacked one upon the other, with insulating means interspaced therebetween, said means for applying a potential connected in parallel to said plurality of actuators.

9. An electroactive device operative to sense changes in a force, said device comprising:

electroactive ceramic substrate means having a disc-shaped, solid ceramic substrate of uniform radius and a pair of opposed, continuous planar surfaces and a thickness aspect, said ceramic substrate having a $d_{33}$ direction parallel to said thickness aspect, and $d_{31}$ and $d_{32}$ directions parallel to said planar surfaces;

conductive electrodes sandwiching said ceramic substrate a first metal cap having a truncated conical shape and formed from a sheet metal stamping and a rim portion joined to a first planar surface of said ceramic substrate;

a second metal cap having a truncated conical shape and formed from a sheet metal stamping and a rim portion joined to a second planar surface of said ceramic substrate, said second planar surface opposed to said first planar surface;

means for applying a potential across said conductive electrodes to cause a field in the $d_{33}$ direction in said ceramic substrate, said force, when applied to a metal cap, causing a dimension change in the radius of said ceramic substrate through said interaction of rim portions of said first metal cap and second metal cap with said ceramic substrate and a change in said potential; and means for sensing said change in potential.

10. The device of claim 9, wherein said electroactive ceramic substrate is poled along the $d_{33}$ direction and exhibits a piezoelectric characteristic.

11. The device of claim 9, wherein said potential is applied between said first metal cap and second metal cap.

12. The device of claim 9, wherein said electroactive ceramic substrate means exhibits an electrostrictive characteristic.

13. The device of claim 9, wherein said electroactive ceramic substrate means exhibits antiferroelectric and ferroelectric switching characteristics.

14. An electroactive device comprising:

an electroactive ceramic substrate including a pair of opposed planar surfaces and a thickness aspect, said substrate having a $d_{33}$ direction parallel to said thickness aspect, and $d_{31}$ and $d_{32}$ directions parallel to said planar surfaces; conductive electrodes sandwiching said ceramic substrate;

a first metal cap having a concave shape, a substantially unchanging thickness and a rim portion bounding said cavity, said rim portion joined to a first planar surface of said ceramic substrate;

a second metal cap having a concave shape, a substantially unchanging thickness and a rim portion bounding said cavity, said rim joined to a second planar surface of said ceramic substrate, said second planar surface opposed to said first planar surface;

means for applying a potential across said conductive electrodes to enable a field in the $d_{33}$ direction that causes a dimension change of said ceramic substrate in at least one of the $d_{31}$ and $d_{32}$ directions, and through said rim portions, a flexure of said first metal cap and second metal cap; and wherein said first metal cap and second metal cap both include apertures and at least one lens means positioned in one of said apertures, said ceramic substrate also including an aperture to enable an externally arranged optical beam to pass through each said aperture and to be affected by movements of said lens means in response to movements of a metal cap upon a change of voltage across said ceramic substrate.

15. An electroactive device comprising:

an electroactive ceramic substrate including a pair of opposed planar surfaces and a thickness aspect, said substrate having a $d_{33}$ direction parallel to said thickness aspect, and $d_{31}$ and $d_{32}$ directions parallel to said planar surfaces;

conductive electrodes sandwiching said ceramic substrate;

a first metal cap having a concave shape, a substantially unchanging thickness and a rim portion bounding said cavity, said rim portion joined to a first planar surface of said ceramic substrate;

a second metal cap having a concave shape, a substantially unchanging thickness and a rim portion bounding said cavity, said rim joined to a second planar surface of said ceramic substrate, said second planar surface opposed to said first planar surface;

means for applying a potential across said conductive electrodes to enable a field in the $d_{33}$ direction that causes a dimension change of said ceramic substrate in at least one of the $d_{31}$ and $d_{32}$ directions, and through said rim portions, a flexure of said first metal cap and second metal cap; and wherein said first metal cap and second metal cap both include apertures, each of said apertures further provided with valve means, said ceramic substrate also including an aperture to enable a fluid to pass therethrough, movements of said of said first metal cap and second metal cap, upon changes of voltage across said ceramic substrate, causing a fluid external to said first metal cap to be passed through said valve means therein, through said aperture in said ceramic substrate and out said valve means in said second metal cap.

* * * * *